G. CRICHTON.
FLY TRAP.
APPLICATION FILED MAY 11, 1912.
1,053,714.
Patented Feb. 18, 1913.
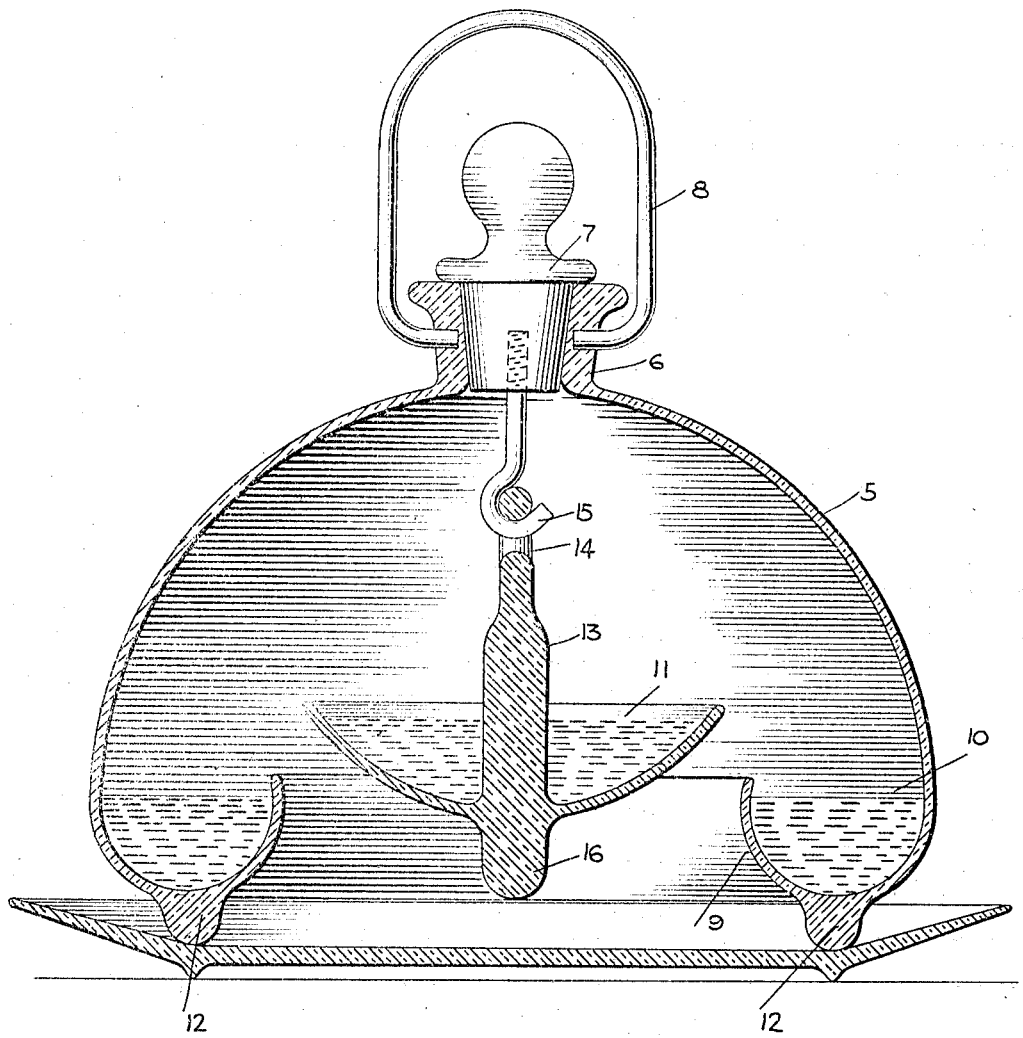
WITNESSES
Sidney Brooks
INVENTOR
George Crichton
BY
ATTORNEYS

UNITED STATES PATENT OFFICE.

GEORGE CRICHTON, OF PEARL RIVER, NEW YORK.

FLY-TRAP.

1,053,714.　　　　Specification of Letters Patent.　　Patented Feb. 18, 1913.

Application filed May 11, 1912. Serial No. 696,654.

*To all whom it may concern:*

Be it known that I, GEORGE CRICHTON, a citizen of the United States, and a resident of Pearl River, in the county of Rockland and State of New York, have invented a new and Improved Fly-Trap, of which the following is a full, clear, and exact description.

Among the principal objects which the present invention has in view are: to provide a device of the character mentioned which is economical of construction and simple of operation; and to provide a device of the character mentioned having a fixed annular receptacle and a removable central receptacle for liquid, together with means for readily removing the central receptacle.

One embodiment of the present invention is disclosed in the structure illustrated in the drawing, in which the figure is a vertical cross section taken on the median line of a trap constructed and arranged in accordance with the present invention.

As seen in the drawing, the major part of the trap comprises an inverted bell-shaped body 5, preferably constructed from glass though any other suitable material will serve the purpose. The body 5 is preferably formed as a cone or half-sphere, at the apex whereof is formed a neck 6 having a central opening to receive a stopper 7. The stopper 7 is preferably constructed of cork or wood, these materials being more adapted to the particular service in which the stopper is employed. A bail 8 is pivotally mounted in the neck 6 whereby the device may, if desired, be suspended from an overhead chandelier or other standing structure.

The lower portion of the body 5 is provided with an up-curled portion 9 shaped as seen in the drawings to form an annular trough 10 having a central opening through which may be passed the saucer 11. To raise the bottom of the body 5 from its support it is furnished at suitable intervals with feet or legs 12. The length of the legs 12 is sufficient to lift the lower edge of the receptacle away from its support a distance sufficient to permit the fly or insect to pass below the opening surrounding the saucer 11.

The saucer 11 is provided with a central stem 13 at the upper end whereof is bored an eyelet 14 to be engaged by a hook 15. The hook 15 is provided with a screw thread to be secured within the stopper 7 and to be supported thereby. The hook 15 is of the open type which permits an operator to lift the saucer 11 and the eyelet 14 thereof from engagement with said hook.

The liquid with which the trough 10 and the saucer 11 are supplied is of any suitable character. Experience has proved that a suitably sweetened and slightly poisoned liquid serves as a bait and a destroyer for insects. The liquid is supplied to the trough 10 by inverting the body 5 and pouring the liquid into the same upon the corked portion thereof, the cork 7 having previously been secured in service position. When the body is thereafter slowly inverted the liquid runs down the side of the body and passes into the trough 10.

The liquid is supplied to the saucer 11 by removing the saucer and while removed filling the same the required depth. To thus place the saucer in operative position the body 5 is lifted and the operator holding the saucer by the pendant handle 16 threads the eyelet 14 over the hook 15, the body of the saucer passing above the inner edge of the trough 10.

The trap may be placed on any suitable support, or as above indicated may be suspended by means of the bail 8. In operation the flies or other insects are attracted by a bait of any suitable kind which brings them within the compass of the opening of the inner trough 10. From this point the flies pass up the inclined curled portion 9 until they pass over the upper edge thereof into the body 5, or sipping the liquid in the trough 10 become thereafter stupefied and by falling into the said liquid drowned. If the insect leaves the upper edge of the portion 9 he is encompassed within the body 5 and is compelled either to alight upon the edge of the saucer 11 or the portion 9, or within the liquid contained within either the trough or saucer. In any event, becoming dazed or exhausted sooner or later the insect is tempted by the liquid to partake thereof and to become thereby destroyed.

The operation of the invention is based to a large extent upon the known peculiarity, that insects rarely will crawl downward over a relatively vertical surface.

Having thus described my invention, what I claim as new and desire to secure by Letters Patent is:—

1. A fly trap comprising a continuously-covered inverted body portion having an open center and an annular trough extending within said body portion; a saucer the diameter of which is less than the inner diameter of said central opening within said trough, said saucer having a centrally vertically disposed stem provided with means for suspending said saucer; and means mounted in said body portion at the median vertical center thereof to engage said stem to suspend said saucer.

2. A fly trap comprising an inverted bell-shaped body having at the lower edge inwardly curled wall portions disposed to form an open center and an annular trough surrounding same; a saucer the diameter of which is less than the said open center, said saucer having integrally formed therewith an upwardly extended stem provided with an eyelet at the upper end thereof; and a closure member for said body having means carried thereby for engaging the eyelet in said stem.

3. A fly trap comprising an inverted bell-shaped body having at the lower edge inwardly curled wall portions disposed to form an open center and an annular trough surrounding same; a saucer the diameter of which is less than the said open center, said saucer having integrally formed therewith an upwardly extended stem provided with an eyelet at the upper end thereof; a closure member for said body having means carried thereby for engaging the eyelet in said stem; and a handle pendant from the bottom of said saucer for manipulating the same.

In testimony whereof I have signed my name to this specification in the presence of two subscribing witnesses.

GEORGE CRICHTON.

Witnesses:
　ALEXANDER OWEN CRICHTON,
　KARLL KRANTZ.